US007000432B2

(12) United States Patent
Itoh et al.

(10) Patent No.: US 7,000,432 B2
(45) Date of Patent: Feb. 21, 2006

(54) PROCESS FOR PRODUCING A GLASS FOR CATHODE RAY TUBES

(75) Inventors: Hajime Itoh, Yokohama (JP); Rei Kitamura, Yokohama (JP); Mitsuyoshi Sakai, Chiba (JP); Keito Sekine, Takasago (JP); Misao Okada, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 308 days.

(21) Appl. No.: 10/091,402

(22) Filed: Mar. 7, 2002

(65) Prior Publication Data

US 2002/0193232 A1    Dec. 19, 2002

(30) Foreign Application Priority Data

Mar. 28, 2001    (JP)    ............................... 2001-093372

(51) Int. Cl.
*C03B 5/16*    (2006.01)
(52) U.S. Cl. ...................... 65/134.2; 65/32.5; 65/134.9
(58) Field of Classification Search ................ 65/32.5, 65/34, 134.1, 134.2, 134.9, 135.1, 346; 264/12
See application file for complete search history.

(56) References Cited

U.S. PATENT DOCUMENTS

| 4,794,860 A | * | 1/1989 | Welton ........................ 65/134.2 |
| 4,886,539 A | * | 12/1989 | Gerutti et al. .............. 65/134.2 |
| 4,919,697 A | * | 4/1990 | Pecoraro et al. ........... 65/134.2 |
| 4,919,700 A | | 4/1990 | Pecoraro et al. |
| 5,849,058 A | | 12/1998 | Takeshita et al. |
| RE36,082 E | | 2/1999 | Ishimura et al. |
| 5,922,097 A | | 7/1999 | Kobayashi et al. |
| 6,119,484 A | | 9/2000 | Takei et al. |
| 6,128,924 A | | 10/2000 | Bange et al. |
| 6,202,445 B1 | | 3/2001 | Sugimoto et al. |

(Continued)

FOREIGN PATENT DOCUMENTS

GB    1147830    *    4/1969

(Continued)

OTHER PUBLICATIONS

C. Tanaka, et al., Proceedings of the International Conference on Science and Technology of New Glasses, No. A4, XP-002141801, pps. 71-76, "Refining of Glasses Under Subatmospheric Pressures", Oct. 16, 1991.

*Primary Examiner*—Steven P. Griffin
*Assistant Examiner*—Carlos Lopez
(74) *Attorney, Agent, or Firm*—Oblon, Spivak, McClelland, Maier & Neustadt, P.C.

(57) ABSTRACT

A process for producing a glass for cathode ray tubes, having a $Sb_2O_3$ content of from 0 to 0.19% as represented by mass percentage and containing $H_2O$, which process comprises a step of melting a raw material in an atmosphere under a pressure of $P_0$ to obtain a molten glass, and a step of vacuum degassing the molten glass in an atmosphere under a pressure $P_A$ which is lower than $P_0$, wherein the pressure P of the molten glass is made to be at most (6.1 W+0.06) atm in the vacuum degassing step, wherein W is the content of said $H_2O$ as represented by mass percentage.

25 Claims, 1 Drawing Sheet

U.S. PATENT DOCUMENTS

Figure 1:
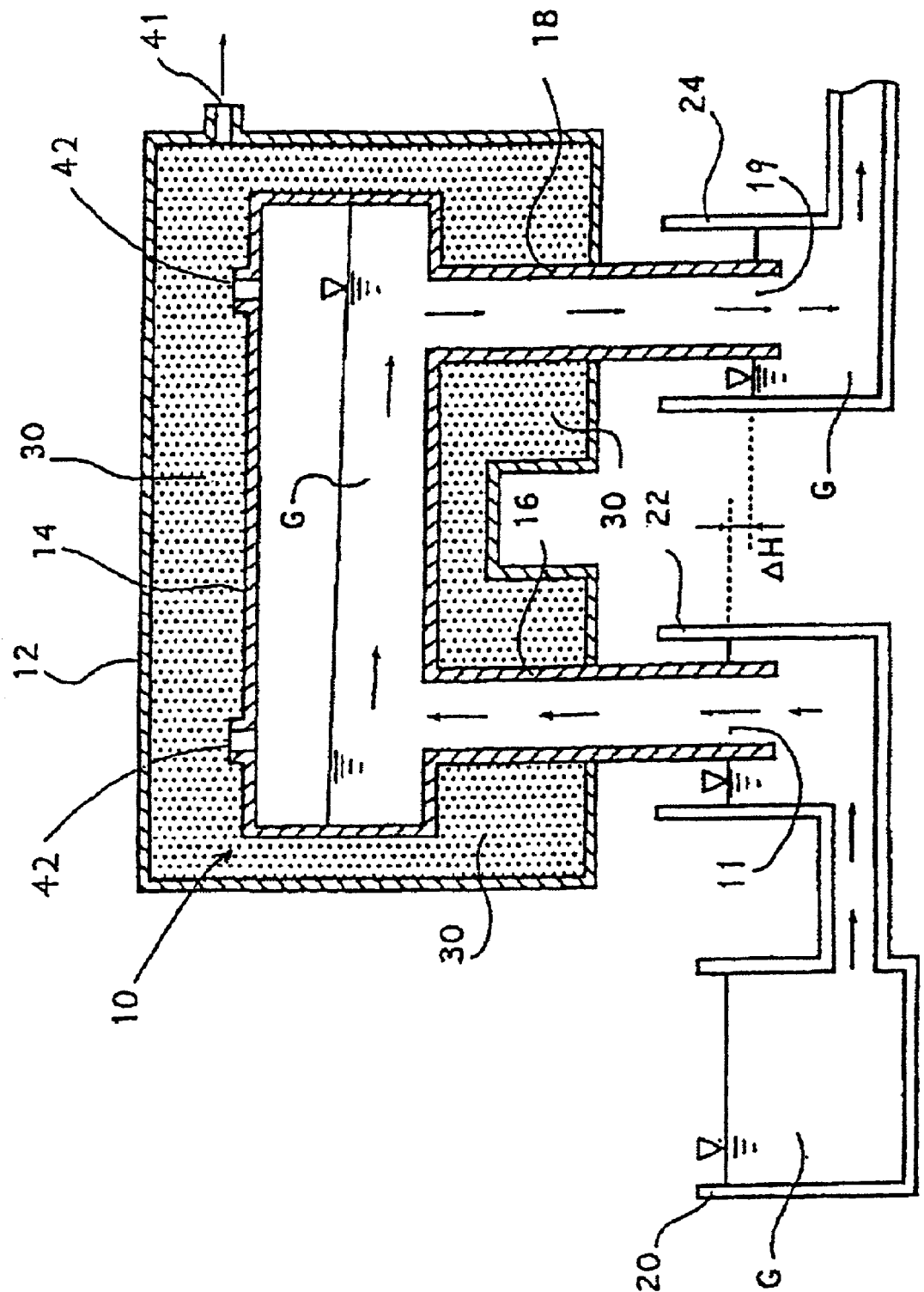

| | | |
|---|---|---|
| 6,251,811 B1 | 6/2001 | Yanagisawa et al. |
| 6,294,005 B1 | 9/2001 | Inoue et al. |
| 6,308,534 B1 | 10/2001 | Takei et al. |
| 6,318,126 B1 | 11/2001 | Takei et al. |
| 6,321,572 B1 | 11/2001 | Takei et al. |
| 6,332,339 B1 * | 12/2001 | Kawaguchi et al. ........ 65/134.2 |
| 6,334,336 B1 | 1/2002 | Takei et al. |
| 6,536,238 B1 * | 3/2003 | Kawaguchi et al. ........ 65/134.9 |
| 6,854,290 B1 * | 2/2005 | Hayes et al. ................ 65/134.2 |

FOREIGN PATENT DOCUMENTS

| | | |
|---|---|---|
| JP | 2000-128549 | 5/2000 |
| JP | 2000-239023 | 9/2000 |

* cited by examiner

PROCESS FOR PRODUCING A GLASS FOR CATHODE RAY TUBES

The present invention relates to a process for producing a glass for cathode ray tubes to be used for television receivers or computer terminal displays.

A cathode ray tube comprises an image display panel, a neck accommodating an electron gun and a funnel connecting the two. These three portions are prepared to have the desired shapes in the respective separate steps and then bonded to form a single cathode ray tube.

In a cathode ray tube, in order to let a phosphor coated on the inner surface of the panel emit light, a high voltage is applied to an anode to discharge electrons and to have the phosphor irradiated with the electrons. At that time, X-rays will be generated, and the glass used for the cathode ray tube is required to have an X-ray absorbing function. However, the glasses of the three portions are required to have different characteristics respectively, in addition to the X-ray absorbing function, and accordingly, they are made of glasses having different compositions.

The glasses to be used for the above three portions are required to have no or little bubbles. Namely, if bubbles are present in the image display panel, the image quality deteriorates, and therefore, the panel is required to have no bubbles. Further, also in the funnel and the neck, bubbles tend to be starting points for fracture which reduces the strength of a cathode ray tube, and they also tend to cause a failure in carbon coating. Accordingly, reduction of such bubbles is desired.

In order to solve such a problem, it has heretofore been common to incorporate $Sb_2O_3$ in a glass for cathode ray tubes to reduce bubbles in the glass for cathode ray tubes by the qualifying function of Sb. The content of such $Sb_2O_3$ used to be from 0.2 to 0.6% as represented by mass percentage.

In recent years, along with the trend for larger sizes and high quality of panels, a problem of image defects which deteriorate the image quality has been distinct in addition to the bubbles. One of such image defects is ash defects. Here, ash defects are turbid opaque or translucent substances which deteriorate the image quality, and their sizes are typically from about 0.1 to 1 mm.

Such ash defects will be formed as follows. Namely, Sb or an antimony compound evaporated from the surface of a molten glass containing $Sb_2O_3$, will condense at a low temperature portion of the structure located above the molten glass, and the condensate will fall into the molten glass and will form ash defects.

In order to reduce such ash defects, it is considered effective to reduce the amount of Sb. However, if the Sb content is reduced, there has been a problem that bubbles will increase.

It is an object of the present invention to solve the above problems and to provide a process for producing a glass for cathode ray tubes, whereby ash defects can be reduced without increasing bubbles.

The present invention provides a process for producing a glass for cathode ray tubes, having a $Sb_2O_3$ content of from 0 to 0.19% as represented by mass percentage and containing $H_2O$, which process comprises a step of melting a raw material in an atmosphere under a pressure of $P_0$ to obtain a molten glass, and a step of vacuum degassing the molten glass in an atmosphere under a pressure $P_A$ which is lower than $P_0$, wherein the pressure P of the molten glass is made to be at most (6.1 W+0.06) atm in the vacuum degassing step, wherein W is the content of said $H_2O$ as represented by mass percentage.

In the accompanying drawing, FIG. 1 is a schematic view of an apparatus for producing the glass for cathode ray tubes, which is suitable for carrying out the process of the present invention.

Now, the present invention will be described in detail with reference to the preferred embodiments.

The glass for cathode ray tubes of the present invention (hereinafter referred to as the glass of the present invention) is a glass to be used for cathode ray tubes, such as a glass for panels, a glass for funnels or a glass for necks.

For the purpose of e.g. reducing bubbles, the glass of the present invention may contain $Sb_2O_3$ in an amount within a range of not more than 0.19% as represented by mass percentage, although incorporation of $Sb_2O_3$ is not essential. If the content exceeds 0.19%, ash defects tend to increase. The content is preferably at most 0.029%, more preferably at most 0.02%, particularly preferably, no $Sb_2O_3$ is contained. Hereinafter, the content in the present invention is represented by mass percentage.

The glass of the present invention contains $H_2O$. Such $H_2O$ is a component to enlarge bubbles in the after-mentioned vacuum degassing step and thereby to increase the rising speed of bubbles. Such a $H_2O$ content is attributable to hydroxyl groups in the raw material, the water content in the raw material or the water content in the melting atmosphere, and the content W is typically from 0.005 to 0.05%, more typically from 0.005 to 0.03%. For example, W in a panel glass melted by usual air combustion is about 0.01%, and W in a funnel glass melted by total oxygen combustion which will be described hereinafter, is about 0.025%. Further, W in a glass for cathode ray tubes, melted by electric heating only, is believed to be about 0.005%.

If W increases, the softening point tends to be too low, and accordingly, W is preferably less than 0.045%.

W (unit: %) is obtained as follows.

Firstly, absorbance $\beta$ of light having a wavelength of from 2.75 to 2.95 $\mu$m, is measured, and the minimum $\beta_{min}$ is divided by the thickness of a test sample to obtain $\beta_{OH}$ (unit: $mm^{-1}$). Further, the $\rho$ (unit: $g/cm^3$) is measured, and W is obtained by the formula 1 using the above $\beta_{OH}$ and the molar absorptivity $\epsilon$=59 (unit: $l \cdot mol^{-1} \cdot cm^{-1}$).

$$W = 18\beta_{OH}/(\epsilon\rho) \qquad \text{Formula 1}$$

The glass of the present invention may contain $SnO_2$ for the purpose of e.g. reducing bubbles, although incorporation of $SnO_2$ is not essential. When it contains $SnO_2$, the content is preferably at most 5%. If it exceeds 5%, coloration of the glass tends to be high. Or, evaporation of Sn or a tin oxide from the surface of the molten glass tends to increase, whereby defects similar to ash defects tend to increase. Further, the price of raw material of $SnO_2$ is high, and the cost of such raw material tends to be high. In order to avoid increase of the coloration, increase of the defects similar to ash defects or increase of the raw material cost, the content is preferably at most 0.1%, more preferably less than 0.01%. Most preferably, no $SnO_2$ is contained.

The glass of the present invention may contain $SO_3$ in a range not to exceed 0.4%, for the purpose of e.g. reducing bubbles, although incorporation of $SO_3$ is not essential. If it exceeds 0.4%, coloration of the glass tends to be high, and a problem of bubbling is likely to take place during heat processing. Further, in a case where the glass of the present invention contains an alkaline earth metal oxide, the $SO_3$ content is preferably at most 0.2% in order to suppress formation of sulfide defects due to reduction of such an alkaline earth metal oxide. When $SO_3$ is contained, the content is preferably at least 0.05%.

The glass of the present invention preferably consists essentially of, based on the following oxides:

| | |
|---|---|
| $SiO_2$ | 45 to 70%, |
| $Al_2O_3$ | 0 to 10%, |
| $Na_2O$ | 1 to 15%, |
| $K_2O$ | 3 to 15%, |
| MgO | 0 to 10%, |
| CaO | 0 to 10%, |
| SrO | 0 to 13%, |
| BaO | 0 to 16%, |
| ZnO | 0 to 5%, |
| $ZrO_2$ | 0 to 5%, |
| $TiO_2$ | 0 to 2%, |
| $CeO_2$ | 0 to 5%, |
| $B_2O_3$ | 0 to 5%, |
| $Sb_2O_3$ | 0 to 0.19%, |
| $H_2O$ | 0.005 to 0.05%, |
| $SnO_2$ | 0 to 5%, and |
| $SO_3$ | 0 to 0.4%. |

The glass of this preferred embodiment is suitable for a panel glass.

Now, the components of the glass of the above-mentioned preferred embodiment will be described. With respect to $Sb_2O_3$, $H_2O$, $SnO_2$ and $SO_3$, their descriptions have already been given above and will be omitted here.

$SiO_2$ is a network former and is essential. If it is less than 45%, the chemical durability deteriorates. It is preferably at least 55%. If it exceeds 70%, the softening point tends to be high. It is preferably at most 67%.

$Al_2O_3$ is not essential but may be contained up to 10%, in order to improve alkali resistance. If it exceeds 10%, the softening point tends to be high. It is preferably at most 4%. In a case where $Al_2O_3$ is contained, the content is preferably at least 0.5%.

$Na_2O$ is a component to lower the softening point and is essential. If it is less than 1%, the softening point tends to be high. It is preferably at least 5%. If it exceeds 15%, the electrical insulating property tends to be low. It is preferably at most 10%.

$K_2O$ is a component to reduce the softening point and to improve the electrical insulating property by the mixed alkali effect with $Na_2O$, and is essential. If it is less than 3%, the softening point tends to be high or the electrical insulating property tends to deteriorate. It is preferably at least 5%. If it exceeds 15%, the thermal expansion coefficient tends to be large. It is preferably at most 10%.

Each of MgO and CaO is not essential, but may be contained up to 10% in order to adjust the softening point. If either one of them exceeds 10%, the softening point tends to be too high. Each is preferably at most 1%, and it is more preferred that neither MgO nor CaO is contained.

SrO is not essential, but may be contained up to 13% in order to increase the X-ray-absorbing function. If it exceeds 13%, the devitrification temperature tends to be high. It is preferably at most 10%. In a case where SrO is contained, the content is preferably at least 5%.

BaO is not essential, but may be contained up to 16% in order to increase the X-ray-absorbing function. If it exceeds 16%, the devitrification temperature tends to be high. It is preferably at most 13%. In a case where BaO is contained, the content is preferably at least 5%.

The total of contents of SrO and BaO is preferably from 10 to 25%. If the total is less than 10%, the X-ray-absorbing function tends to deteriorate. If it exceeds 25%, the devitrification temperature tends to be too high.

ZnO is not essential, but may be contained up to 5% in order to increase the X-ray-absorbing function. If it exceeds 5%, the devitrification temperature tends to be too high. It is preferably at most 2%.

$ZnO_2$ is not essential, but may be contained up to 5% in order to increase the X-ray-absorbing function. If it exceeds 5%, the softening point tends to be too high. It is preferably at most 3%.

$TiO_2$ is not essential, but may be contained up to 2% in order to adjust the viscosity of the glass at a temperature of at least 1,200° C. If it exceeds 2%, the devitrification temperature tends to be high. It is preferably at most 1%.

$CeO_2$ is not essential, but may be contained up to 5% in order to suppress electron ray browning. If it exceeds 5%, the devitrification temperature tends to be high. It is preferably at most 1%.

$B_2O_3$ is not essential, but may be contained up to 5% in order to improve the meltability. If it exceeds 5%, the softening temperature tends to be low. It is preferably at most 1%.

The glass of the preferred embodiment of the present invention consists essentially of the above-described components, but may contain other components within a range not to impair the purpose of the present invention. The total of contents of such other components is preferably at most 10%, more preferably at most 5%.

As such other components, coloring components such as $Fe_2O_3$ may, for example, be mentioned. Further, it is preferred not to contain $As_2O_3$.

Now, each step in the process of the present invention will be described.

The melting step in the present invention i.e. the step of melting a raw material in an atmosphere under a pressure of $P_0$, is not particularly limited. $P_0$ is preferably from 0.8 to 1.2 atm. For example, the raw material is put into a usual tank furnace, and by means of heavy oil, city gas or electricity, this raw material is heated and melted to obtain a molten glass. In this case, $P_0$ is atmospheric pressure and is typically 1 atm.

Further, in order to increase the $H_2O$ content W in the glass of the present invention, water may be added to the raw material, or the moisture concentration in the atmosphere for melting the raw material may be increased. As a method of increasing the moisture concentration in the atmosphere, so-called total oxygen combustion wherein the fuel is burned by an oxygen gas having an oxygen concentration of at least 90 vol %, may, for example, be mentioned.

The raw material to be melted in the melting step includes glass cullet.

Further, the molten glass obtainable by melting the raw material in the melting step, is a glass in a molten state free from non-melted raw material.

By the vacuum degassing step in the present invention, i.e. by the vacuum treatment wherein the molten glass is held in an atmosphere under a pressure $P_A$ which is lower than $P_0$, refining is carried out to reduce bubbles present in the molten glass. Such vacuum treatment is carried out, for example, in such a manner that the molten glass is introduced into a vacuum degassing tank which has an inlet to introduce the molten glass and an outlet to discharge the molten glass and in which the pressure $P_A$ of the atmosphere can be made to be lower than $P_0$, and the molten glass is held in the atmosphere under such a pressure $P_A$ and then discharged. The above inlet and outlet are always sealed with the molten glass, whereby $P_A$ can be maintained at a level lower than $P_0$. The shape of the vacuum degassing tank is not particularly limited, but a so-called gantry shape is preferred.

In the present invention, the pressure P of the molten glass to be refined, is determined by $P_A$ and the depth from the surface of the molten glass. Further, usually, P is not constant and changes during the vacuum degassing step. Here, in a state where the molten glass is flowing, P is the pressure of a certain very small portion of this flowing molten glass, and depending upon the change of the position of the very small portion, P may or may not change.

In the present invention, in the vacuum degassing step, i.e. at a certain point of time during the vacuum degassing step, p is made to be at most (6.1 W+0.06) atm. By this operation, the speed of gas components such as $H_2O$, $O_2$, $CO_2$, etc. dissolved in the molten glass, flowing into bubbles, is remarkably increased, and as a result, the radii of bubbles, accordingly the rising speeds of the bubbles will increase, whereby the time until the bubbles reach the molten glass surface will be remarkably shortened. Namely, reduction of bubbles will be accelerated.

Now, experimental results will be described, which show that as P is lowered, the diameters of bubbles will remarkably increase from (6.1 W+0.06) atm as a turning point.

A raw material was prepared so that the composition as represented by mass percentage would be 62.5% of $SiO_2$, 2% of $Al_2O_3$, 7.5% of $Na_2O$, 7.5% of $K_2O$, 8% of SrO, 9.5% BaO, 0.5% of ZnO, 2% of $ZrO_2$, 0.4% of $TiO_2$ and 0.05% of $Fe_2O_3$, and it was melted in an atmosphere of 1 atm at 1,500° C. by means of an electric furnace capable of adjusting the moisture in the atmosphere, to obtain three types of panel glasses differing in the content W of $H_2O$ wherein bubbles were present although non-melted substance was not present, i.e. panel glasses A (W=0.008%), B (W=0.017%) and C (W=0.021%). Further, the density of each of the panel glasses A, B and C was 2.8 g/cm³.

The panel glasses A, B and C were subjected to vacuum treatment by means of an electric furnace capable of adjusting the atmospheric pressure $P_A$ to a level of less than 1 atm, whereby the relation between $P_A$ and the bubble radius, was examined. This vacuum treatment was carried out by introducing the glass into a quartz cell having a thickness of 50 mm in an amount such that the depth during the melting would be 10 mm. In such a case, so-called head pressure of the molten glass is small, and accordingly, the pressure P of the molten glass can be regarded as the same as $P_A$.

$P_A$ was changed while observing the change in the radius of bubbles in the molten glass by means of a video camera through a transparent window provided on the side surface of the electric furnace. Namely, $P_A$ was lowered from 1 atm at a rate of 0.0263 atm/min, whereby the change in the radius of bubbles present in the panel glasses A, B and C was examined. The relation between $P_A$ (unit: atm) and the bubble radius (unit: mm) is shown in Table 1. Symbol "—" in the Table 1 indicates that no measurement was carried out.

(6.1 W+0.06) of the panel glasses A, B and C was 0.11 atm, 0.16 atm and 0.19 atm, respectively, and it is evident that the bubble radius remarkably increased when $P_A$ became at most (6.1 W+0.06).

TABLE 1

| $P_A$ | Panel glass A | Panel Glass B | Panel Glass C |
|---|---|---|---|
| 1 | — | 0.072 | — |
| 0.8684 | — | — | — |
| 0.7368 | — | — | — |

TABLE 1-continued

| $P_A$ | Panel glass A | Panel Glass B | Panel Glass C |
|---|---|---|---|
| 0.6053 | — | — | — |
| 0.5263 | — | 0.095 | — |
| 0.4737 | — | 0.104 | 0.089 |
| 0.4211 | 0.061 | — | — |
| 0.3947 | — | 0.113 | — |
| 0.3684 | — | 0.120 | 0.100 |
| 0.3421 | 0.066 | 0.125 | 0.103 |
| 0.3158 | — | — | 0.106 |
| 0.2895 | — | 0.134 | 0.126 |
| 0.2632 | — | 0.152 | 0.134 |
| 0.2368 | 0.080 | 0.162 | 0.140 |
| 0.2105 | 0.083 | 0.184 | 0.165 |
| 0.1842 | 0.083 | 0.217 | 0.197 |
| 0.1579 | 0.086 | 0.282 | 0.327 |
| 0.1316 | — | 0.611 | — |
| 0.1053 | 0.095 | — | — |
| 0.0789 | 0.115 | — | — |
| 0.0526 | 0.141 | — | — |
| 0.0263 | 0.228 | — | — |

The period of time t during which P is at most (6.1 W+0.06) atm, is determined taking into consideration the depth of the molten glass, the radius of bubbles to be reduced, the viscosity of the molten glass, the flow rate of the molten glass, etc., but it is typically at least 0.1 hour.

The glass of the present invention may contain a component which used to be considered to have a clarifying function (hereinafter referred to as a clarifying agent) such a $Sb_2O_3$, $As_2O_3$, $SnO_2$, $SO_3$ or F. However, according to the present invention, bubbles can be reduced even if the glass of the present invention contains no such clarifying component at all. This is believed to be attributable to the fact that the rate at which $H_2O$ dissolved in the glass of the present invention flows into bubbles to enlarge the bubbles, remarkably increases as P is made to be at most (6.1 W+0.06) atm, whereby rising of bubbles is thereby accelerated.

Further, $H_2O$ is not a conventional clarifying agent, and it is not easy to adjust the content. Namely, the content of the conventional clarifying agent in the glass is substantially determined by the content in the raw material. However, with respect to $H_2O$, such does not apply, and as mentioned above, an influence of e.g. the moisture content in the melting furnace is substantial, whereby it is not easy to adjust the $H_2O$ content in the glass. However, in the present invention, the clarifying action of $H_2O$ can easily be obtained by adjusting P.

Said P is typically at least 0.01 atm. Even if the pressure is made less than 0.01 atm, the possibility of further reducing bubbles, is low. It is more typically at least 0.03 atm.

Now, the present invention will be described with reference to FIG. 1, but the present invention is by no means restricted thereto.

FIG. 1 is a schematic view of an apparatus for producing a glass for cathode ray tubes, which is suitable for carrying out the process of the present invention, and the present invention will be described with reference to the figure. The vacuum degassing tank in FIG. 1 is of a gantry shape.

In a tank furnace 20 (details of e.g. the upper structure are not shown), a raw material (not shown) is melted in an atmosphere wherein the pressure is $P_0$, to obtain a molten glass G. As shown by arrows, the molten glass G is led to an upstream side pit 22 and enters from an inlet 11 into a vacuum degassing tank 10. The pressure of the molten glass at the inlet 11 is $P_0$.

The vacuum degassing tank 10 comprises a riser tube 16, a horizontal vessel 14 and a down comer 18. A part of the riser tube 16, a part of the down comer 18 and the horizontal vessel 14 are accommodated in a vacuum container 12.

The vacuum container 12 is, for example, a heat resistant steel casing, and the interior thereof is evacuated from an aperture 41 by a vacuum pump (not shown), so that the pressure $P_A$ at the interior of the vacuum container 12 is lower than $P_0$, and the pressure of the molten glass G at the bottom in the horizontal vessel 14 is set to be at most (6.1 W+0.06) atm.

In order to bring the atmospheric pressure in the interior of the vacuum degassing tank 10 to $P_A$, apertures 42 are provided at an upper portion of the horizontal vessel 14.

The space around the vacuum degassing tank 10 in the vacuum container 12 is usually filled with heat insulating bricks 30.

In the vacuum degassing tank 10, the molten glass G flows in the order of the riser tube 16, the horizontal vessel 14 and the down comer 18, as shown by arrows. The riser tube 16, the horizontal vessel 14 and the down comer 18 are constructed by a material excellent in heat resistance, corrosion resistance against molten glass, etc. As such a material, platinum, a platinum alloy, an $Al_2O_3$—$ZrO_2$—$SiO_2$ type electrocast brick or a $ZrO_2$ type electrocast brick, may, for example, be mentioned. Further, a heater may be provided in order to raise the temperature of the molten glass in the vacuum degassing tank 10. For example, platinum or a platinum alloy may be used at a portion in contact with the molten glass G, of the vacuum degassing tank 10, so that this may be used as a heater by conducting an electric current to such platinum or a platinum alloy.

The molten glass G is discharged from an outlet 19 to a downstream side pit 24 and sent to a pressing apparatus (not shown) in a case where a panel glass or a funnel glass is to be produced. The pressure of the molten glass at the outlet 19 is $P_0$.

In correspondence with a pressure loss resulting from flowing of the molten glass G in the vacuum degassing tank 10, a level difference of $\Delta H$ will form between the surface of the molten glass G at the upstream side pit 22 and the surface of the molten glass G at the downstream side pit 24.

The viscosity of the molten glass G at the inlet 11 is preferably from 100 to 1,000 poise.

The temperature of the molten glass G at the inlet 11 is preferably from 1,300 to 1,450° C. in the case of a panel glass.

The viscosity of the molten glass at the outlet 19 is preferably from 300 to 1,000 poise.

The temperature of the molten glass at the outlet 19 is preferably from 1,200 to 1,300° C. in the case of a panel glass.

The viscosity of the molten glass G in the horizontal vessel 14 is preferably at least 200 poise. If it is less than 200 poise, the molten glass is likely to leak out from the horizontal vessel 14. The portion where such leakage is likely, may, for example, be a joint portion between electrocast bricks in a case where the horizontal vessel 14 is constituted by electrocast bricks, etc., or seams of a platinum alloy in a case where the vacuum degassing tank is constituted by a platinum alloy, etc. Further, such a viscosity is preferably at most 600 poise.

The temperature of the molten glass G in the horizontal vessel 14 is preferably from 1,250 to 1,350° C. in the case of a panel glass.

The pressure on the free surface of the molten glass G in the vacuum degassing tank 10, i.e. the pressure of the free surface of the molten glass G in the horizontal vessel 14, is substantially equal to the pressure in the interior of the vacuum container 12.

The depth of the molten glass G in the interior of the horizontal vessel 14 is preferably at most 400 mm. If it exceeds 400 mm, the heat dissipation from the molten glass G to the horizontal vessel 14 tends to be too much, and consequently, the viscosity is likely to be too high, or the temperature is likely to decrease too much. Further, the depth is preferably at least 100 mm. If it is less than 100 mm, the width of the horizontal vessel 14 tends to be too wide in order to obtain the desired flow rate of the molten glass G, whereby the horizontal vessel 14 is likely to be too large.

EXAMPLES 1 to 4

A raw material was prepared to have a composition shown, as represented by mass percentage, in the lines for from $SiO_2$ to $Fe_2O_3$ in Table 2, and the obtained raw material was put into a platinum crucible and melted at 1,500° C. for 2 hours in an atmosphere of 1 atm by means of a city gas combustion furnace (Examples 1 to 4). Here, the depth of the molten glass in the crucible was 30 mm. In each of Examples 1 to 3, the $H_2O$ content (=W) of the obtained glass was measured.

Then, in each of Examples 1 to 3, the platinum crucible containing the molten glass was maintained for 0.5 hour in an electric furnace wherein the atmospheric pressure was set to be $P_A$ (unit: atm), and the temperature was set to be 1,350° C. and subjected to vacuum treatment. In Example 4, no such vacuum treatment was carried out. The viscosity at 1,350° C. of the glass in each of Examples 1 to 3 was 214 poise, and the density at 1,350° C. was 2.6 g/cm$^3$. Further, the head pressure of the molten glass at the bottom of the platinum crucible was 0.008 atm and low as compared with $P_A$, whereby the pressure of the molten glass in the platinum crucible was regarded as being equal to $P_A$.

(6.1 W+0.06) (unit: atm) shown in Table 2 is larger than $P_A$ with respect to any one of Examples 1 to 3. Namely, Examples 1 to 3 are Examples of the present invention. On the other hand, Example 4 is a Comparative Example.

Also the number of bubbles (unit: number/g) in each of Examples 1 to 4 is shown in Table 2. The number of bubbles is preferably at most 0.1 bubble/g, more preferably at most 0.02 bubble/g.

TABLE 2

|  | Ex. 1 | Ex. 2 | Ex. 3 | Ex. 4 |
| --- | --- | --- | --- | --- |
| $SiO_2$ | 62.5 | 62.5 | 62.6 | 62.2 |
| $Al_2O_3$ | 2.0 | 2.0 | 2.0 | 2.0 |
| $Na_2O$ | 7.5 | 7.5 | 7.5 | 7.5 |
| $K_2O$ | 7.5 | 7.5 | 7.5 | 7.5 |
| SrO | 8.0 | 8.0 | 8.0 | 8.0 |
| BaO | 9.5 | 9.5 | 9.5 | 9.5 |
| ZnO | 0.5 | 0.5 | 0.5 | 0.5 |
| $ZrO_2$ | 2.0 | 2.0 | 2.0 | 2.0 |
| $TiO_2$ | 0.4 | 0.4 | 0.4 | 0.4 |
| $Sb_2O_3$ | 0 | 0 | 0 | 0.4 |
| $SO_3$ | 0.1 | 0.2 | 0.4 | 0 |
| $Fe_2O_3$ | 0.05 | 0.05 | 0.05 | 0.05 |
| $H_2O$ | 0.013 | 0.014 | 0.014 | — |
| $P_A$ | 0.05 | 0.08 | 0.11 | — |
| 6.1 W + 0.06 | 0.14 | 0.15 | 0.15 | — |
| Number of bubbles | 0 | 0.02 | 0 | 0.1 |

According to the process of the present invention, bubbles in the glass for cathode ray tubes can be reduced without incorporating $Sb_2O_3$ or incorporating a smaller amount of $Sb_2O_3$ than ever. It is thereby possible to reduce or eliminate ash defects.

The entire disclosure of Japanese Patent Application No. 2001-93372 filed on Mar. 28, 2001 including specification, claims, drawings and summary are incorporated herein by reference in its entirety.

What is claimed is:

1. A process for producing glass for cathode ray tubes, which comprises:

increasing water content in a raw material;

melting the raw material in an atmosphere under a pressure of $P_0$ to obtain a molten glass;

vacuum degassing the molten glass in an atmosphere under a pressure of $P_A$, which is less than $P_0$;

wherein the pressure P of the molten glass is made to be at most (6.1 W+0.06) atm in the vacuum degassing step, and wherein W is the content of water in mass %; and wherein an obtained hardened glass has at most 0.1 bubbles/g.

2. The process for producing glass for cathode ray tubes according to claim 1, wherein the period of time during which the pressure P of the molten glass is made to be at most (6.1 W+0.06) atm, is at least 0.1 hour.

3. The process for producing glass for cathode ray tubes according to claim 1, wherein $P_0$ is from 0.8 atm to 1.2 atm.

4. The process for producing glass for cathode ray tubes according to claim 1, wherein W is from 0.005 mass % to 0.05 mass %.

5. The process for producing glass for cathode ray tubes according to claim 1, wherein the glass for cathode ray tubes consists essentially of the following oxides:

| | |
|---|---|
| $SiO_2$ | 45 to 70%, |
| $Al_2O_3$ | 0 to 10%, |
| $Na_2O$ | 1 to 15%, |
| $K_2O$ | 3 to 15%, |
| MgO | 0 to 10%, |
| CaO | 0 to 10%, |
| SrO | 0 to 13%, |
| BaO | 0 to 16%, |
| ZnO | 0 to 5%, |
| $ZrO_2$ | 0 to 5%, |
| $TiO_2$ | 0 to 2%, |
| $CeO_2$ | 0 to 5%, |
| $B_2O_3$ | 0 to 5%, |
| $Sb_2O_3$ | 0 to 0.19%, |
| $H_2O$ | 0.005 to 0.05%, |
| $SnO_2$ | 0 to 5%, and |
| $SO_3$ | 0 to 0.4%. |

6. The process for producing glass for cathode ray tubes according to claim 1, wherein the $Sb_2O_3$ is from 0 mass % to 0.029 mass %.

7. The process for producing glass for cathode ray tubes according to claim 1, wherein the raw material contains no $SnO_2$.

8. The process for producing glass for cathode ray tubes according to claim 1, wherein the raw material comprises $SO_3$ in an amount that ranges from 0.05 mass % to 0.4 mass %.

9. The process for producing glass for cathode ray tubes according to claim 1, wherein said hardened glass comprises at most 0.02 bubbles/g.

10. The process for producing glass for cathode ray tubes according to claim 1, wherein bubbles formed during said vacuum degassing have a bubble volume expansion ratio is less than 100; wherein the bubble volume expansion ratio is expressed as a ratio of the average volume of a bubble present in the molten glass in an atmosphere under a pressure $P_A$ to the average volume of a bubble in the molten glass in an atmosphere under a pressure $P_0$.

11. The process for producing glass for cathode ray tubes according to claim 1, wherein the molten glass in an atmosphere under a pressure $P_A$ is at a temperature from 1250° C. to 1350° C.

12. The process for producing glass for cathode ray tubes according to claim 1, wherein the vacuum degassing occurs in a vacuum degassing tank and the depth of the molten glass in the vacuum degassing tank ranges from at least 100 mm to at most 400 mm.

13. A process for producing glass for cathode ray tubes, which comprises:

melting a raw material in an atmosphere under a pressure of $P_0$ to obtain a molten glass;

increasing a water content in the molten glass;

vacuum degassing the molten glass in an atmosphere under a pressure of $P_A$, which is lower than $P_0$;

wherein the pressure P of the molten glass is made to be at most (6.1 W+0.06) atm in the vacuum degassing step, and wherein W is the content of water in mass %; and wherein an obtained hardened glass has at most 0.1 bubbles/g.

14. The process for producing glass for cathode ray tubes according to claim 13, wherein the period of time during which the pressure P of the molten glass is made to be at most (6.1 W+0.06) atm, is at least 0.1 hour.

15. The process for producing glass for cathode ray tubes according to claim 13, wherein $P_0$ is from 0.8 atm to 1.2 atm.

16. The process for producing glass for cathode ray tubes according to claim 13, wherein W is from 0.005 mass % to 0.05 mass %.

17. The process for producing glass for cathode ray tubes according to claim 13, wherein the glass for cathode ray tubes consists essentially of the following oxides:

| | |
|---|---|
| $SiO_2$ | 45 to 70 mass %, |
| $Al_2O_3$ | 0 to 10 mass %, |
| $Na_2O$ | 1 to 15 mass %, |
| $K_2O$ | 3 to 15 mass %, |
| MgO | 0 to 10 mass %, |
| CaO | 0 to 10 mass %, |
| SrO | 0 to 13 mass %, |
| BaO | 0 to 16 mass %, |
| ZnO | 0 to 5 mass %, |
| $ZrO_2$ | 0 to 5 mass %, |
| $TiO_2$ | 0 to 2 mass %, |
| $CeO_2$ | 0 to 5 mass %, |
| $B_2O_3$ | 0 to 5 mass %, |
| $Sb_2O_3$ | 0 to 0.19 mass %, |
| $H_2O$ | 0.005 to 0.05 mass %, |
| $SnO_2$ | 0 to 5 mass %, and |
| $SO_3$ | 0 to 0.4 mass %. |

18. The process for producing glass for cathode ray tubes according to claim 13, wherein the $Sb_2O_3$ is from 0 mass % to 0.029 mass %.

19. The process for producing glass for cathode ray tubes according to claim 13, wherein the raw material contains no $SnO_2$.

20. The process for producing glass for cathode ray tubes according to claim 13, wherein the raw material comprises $SO_3$ in an amount that ranges from 0.05 mass % to 0.4 mass %.

21. The process for producing glass for cathode ray tubes according to claim 13, wherein said hardened glass comprises at most 0.02 bubbles/g.

22. The process for producing glass for cathode ray tubes according to claim 13, wherein bubbles formed during said vacuum degassing have a bubble volume expansion ratio is less than 100; wherein the bubble volume expansion ratio is expressed as a ratio of the average volume of a bubble present in the molten glass in an atmosphere under a pressure $P_A$ to the average volume of a bubble in the molten glass in an atmosphere under a pressure $P_0$.

23. The process for producing glass for cathode ray tubes according to claim 13, wherein the molten glass in an atmosphere under a pressure $P_A$ is at a temperature from 1250° C. to 1350° C.

24. The process for producing glass for cathode ray tubes according to claim 13, wherein the vacuum degassing occurs in a vacuum degassing tank and the depth of the molten glass in the vacuum degassing tank ranges from at least 100 mm to at most 400 mm.

25. The process for producing glass for cathode ray tubes according to claim 13, wherein the increasing water content in the molten glass occurs by burning fuel in the presence of an oxygen gas comprising an oxygen concentration of at least 90 vol %.

* * * * *